(12) United States Patent
Kim et al.

(10) Patent No.: US 6,859,254 B2
(45) Date of Patent: Feb. 22, 2005

(54) LIQUID CRYSTAL DISPLAY DEVICE AND METHOD FOR FABRICATING THE SAME

(75) Inventors: Woo-Hyun Kim, Seoul (KR); Yong-Sup Hwang, Gyeonggi-Do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 98 days.

(21) Appl. No.: 10/314,373

(22) Filed: Dec. 9, 2002

(65) Prior Publication Data

US 2003/0122983 A1 Jul. 3, 2003

(30) Foreign Application Priority Data

Dec. 31, 2001 (KR) .............................. 10-2001-0089306

(51) Int. Cl.[7] .......................................... G02F 1/1339
(52) U.S. Cl. ...................................... 349/190; 349/187
(58) Field of Search ............................... 349/190, 189, 349/153

(56) References Cited

U.S. PATENT DOCUMENTS 6,646,709 B2 * 11/2003 Matsumoto ................. 349/156
6,671,030 B2 * 12/2003 Gyoda ........................ 349/190

* cited by examiner

*Primary Examiner*—Robert H. Kim
*Assistant Examiner*—Richard H Kim
(74) *Attorney, Agent, or Firm*—Morgan, Lewis & Bockius LLP (57) ABSTRACT

A liquid crystal display device includes a first substrate having a plurality of thin film transistors and a plurality of metal lines, a first insulation material layer formed on the metal lines, a second insulation material layer formed on the first insulation material layer on the metal lines, a first hole formed in the second insulation material layer over at least two of the metal lines, a second contact hole formed in the first and second insulation layers exposing a drain electrode of the thin film transistors, a pixel electrode connected to the drain electrode through the second contact hole, a sealing material formed within the first hole, a second substrate bonded to the first substrate via the sealing material, and a liquid crystal material disposed between the first and second substrates.

5 Claims, 7 Drawing Sheets

LIQUID CRYSTAL DISPLAY DEVICE AND METHOD FOR FABRICATING THE SAME

The present invention claims benefit of Korean Patent Application No. 89306/2001 filed in Korea on Dec. 31, 2001, which is hereby incorporated by reference.

BACKGROUND OF THE INVENTION

1. Field of the Invention

The present invention relates to a liquid crystal display device and, more particularly, to a liquid crystal display device having an improved attachment of a liquid crystal panel for improving a sealing force of a sealing material.

2. Description of the Related Art

In general, a liquid crystal display (LCD) device is a transmission-type flat panel display device adaptable to various electronic instruments, such as mobile phones, personal digital assistants (PDAs), notebook computers, and lap-top computers. Because of their light weight, thin profile, compact size, and high picture quality, the LCD device is advantageous as compared to other flat panel display devices. Generally, the LCD device can be categorized based upon its method for manipulating liquid crystal molecules. Presently, a thin film transistor (TFT) LCD device is commonly used due to its relatively fast reaction speed and low residual image.

Figure 1:
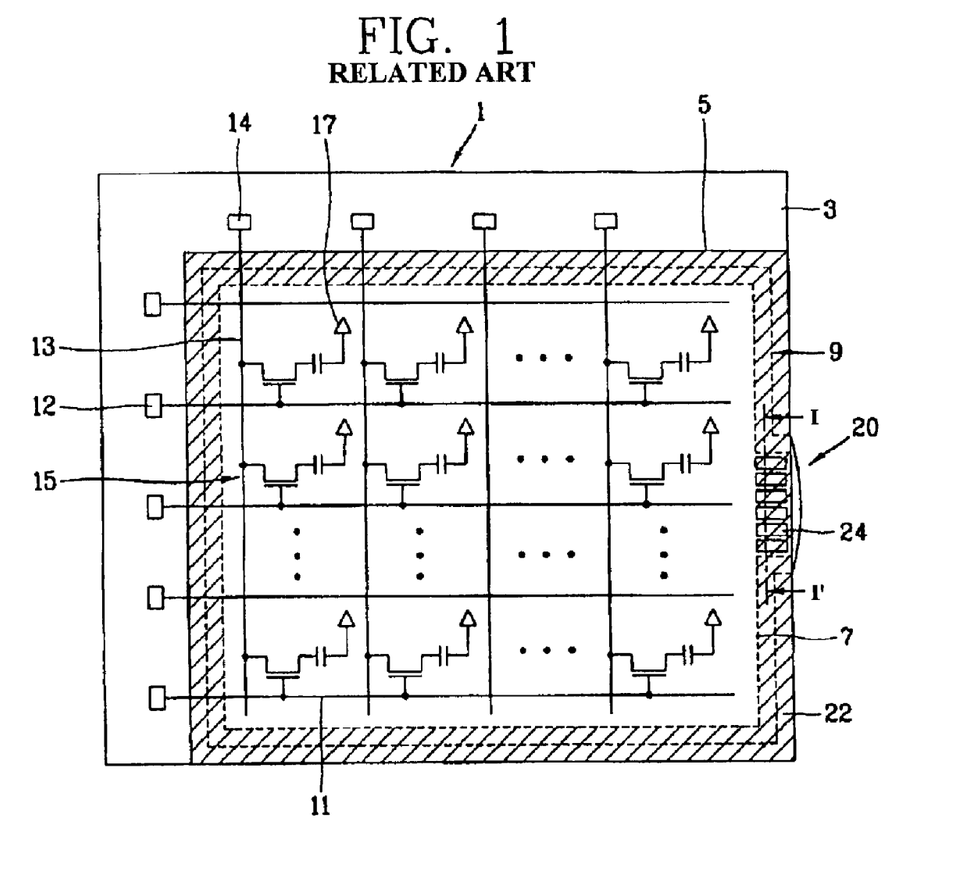
FIG. 1 is a plan view of a liquid crystal display device according to the related art.

FIG. 1 is a plan view of a liquid crystal display device according to the related art. In FIG. 1, a TFT LCD 1 includes a lower substrate 3, an upper substrate 5, and a liquid crystal material layer 17 formed between the lower substrate 3 and the upper substrate 5. Gate lines 11 are arranged along a first direction on the lower substrate, and data lines 13 are arranged along a second direction perpendicular to the gate lines on the lower substrate. Intersections of the gate and data lines 11 and 13 define a plurality of pixel regions. The gate lines 11 and the data lines 13 are electrically connected to external drive devices (not shown) through pads 12 and 14, respectively, that are formed along a non-displaying region of the lower substrate 3. As a scan signal is applied to each pixel through the gate line 11, a corresponding TFT 15 is enabled to supply an image signal input through the data line 13 to the liquid crystal material layer 17.

A sealing region 7 is formed along marginal portions of the lower substrate 3 and the upper substrate 5, and a sealing material 22 is deposited on the sealing region. Accordingly, the lower substrate 3 and the upper substrate 5 are attached by the sealing material 22. In addition, a black matrix 9 and a light shielding element (not shown) are formed at the sealing region 7 to prevent light transmission to the sealing region 7, wherein the black matrix 9 is formed at the upper substrate 5. The sealing region 7 includes liquid crystal injection opening 20 for injecting liquid crystal material between the lower substrate 3 and the lower substrate 5 after they are attached. After the liquid crystal material is injected through the liquid crystal injection opening 20, the liquid crystal injection opening 20 is encapsulated by an encapsulation material. Since the encapsulation material is commonly made of a photosensitive material, after the encapsulation material is filled in the liquid crystal injection opening 20, ultraviolet light is irradiated thereto to harden the encapsulation material. In addition, the TFT LCD 1 includes a metal layer 24 formed along the marginal portions of the substrate to electrically interconnect the gate line 11 and the data line 13 to the pads 12 and 14, respectively, and to external drive circuits (not shown).

Figure 2:
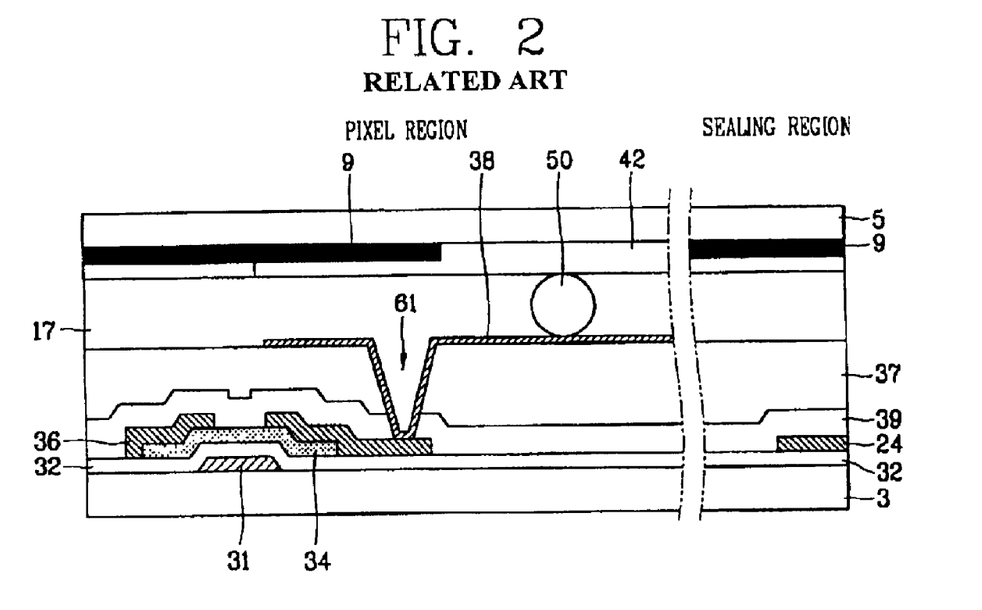
FIG. 2 is a cross sectional view of a pixel region and a sealing region of the liquid crystal display device along I–I' of FIG. 1 according to the related art.

FIG. 2 is a cross sectional view of a pixel region and a sealing region of the liquid crystal display device along I–I' of FIG. 1 according to the related art. In FIG. 2, a gate electrode 31 is formed on the lower substrate 3 of the pixel region, and a gate insulation layer 32 is stacked over the lower substrate 3. A semiconductor layer 34 is formed on the gate insulation layer 32, and as a scan signal is applied to the gate electrode 31, the semiconductor layer 34 is activated to form a channel layer between source/drain electrodes 36. As the semiconductor layer 34 is activated, a data signal is input to the source/drain electrodes 36 through the data line 13.

An inorganic passivation layer 39 made of an inorganic substance is formed on the source/drain electrode 36, and an organic passivation layer 37 made of an organic substance having a low dielectric constant, such as a photo acryl or Benzocyclobutene (BCB) is formed on the inorganic passivation layer 39. Formation of the organic passivation layer 37 allows for implementation of a high aperture ratio, whereby a liquid crystal display device with a flat surface can be fabricated.

A pixel electrode 38 made of a transparent material such as Indium Tin Oxide (ITO) is formed on the organic passivation layer 37 and is electrically connected to the source/drain electrodes 36 through the contact hole 61 formed at the inorganic passivation layer 39 and the organic passivation layer 37. Although not shown, an alignment layer is deposited on the organic passivation layer 37 to align the liquid crystal molecules of the liquid crystal material layer 17.

The black matrix 9 and a color filter layer 42 for implementing color are formed on the upper substrate 5. The black matrix 9 is made of Cr, CrOx, and Cr/CrOx, and is formed at the TFT region of the pixel region near the gate and data lines by the sealing region. In addition, a common electrode (not shown) is formed on the black matrix 9 and the color filter layer 42, whereby an electric field is formed between the common electrode and the pixel electrode to drive the liquid crystal molecules of the liquid crystal material layer 17. The alignment layer (not shown) is formed on the common electrode to align the liquid crystal molecules.

A plurality of spacers 50 are distributed between the lower substrate 3 having the TFT formed thereon and the upper substrate 5 having the color filter layer 42 formed thereon to maintain a uniform cell gap. In addition, after the lower substrate 3 and the upper substrate 5 are sealed, the liquid crystal material is injected into the cell gap through the liquid crystal injection opening 20 (in FIG. 1) to form the liquid crystal material layer 17.

Figure 3A:
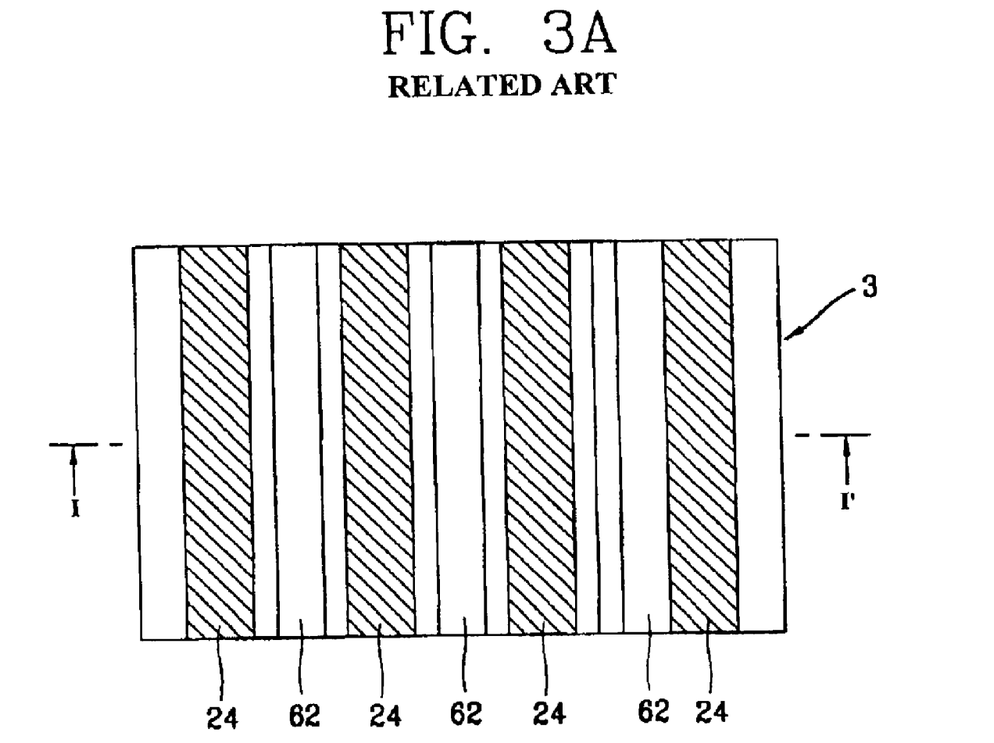
FIG. 3A is a plan view of a sealing region of a liquid crystal display device according to the related art.
Figure 3B:
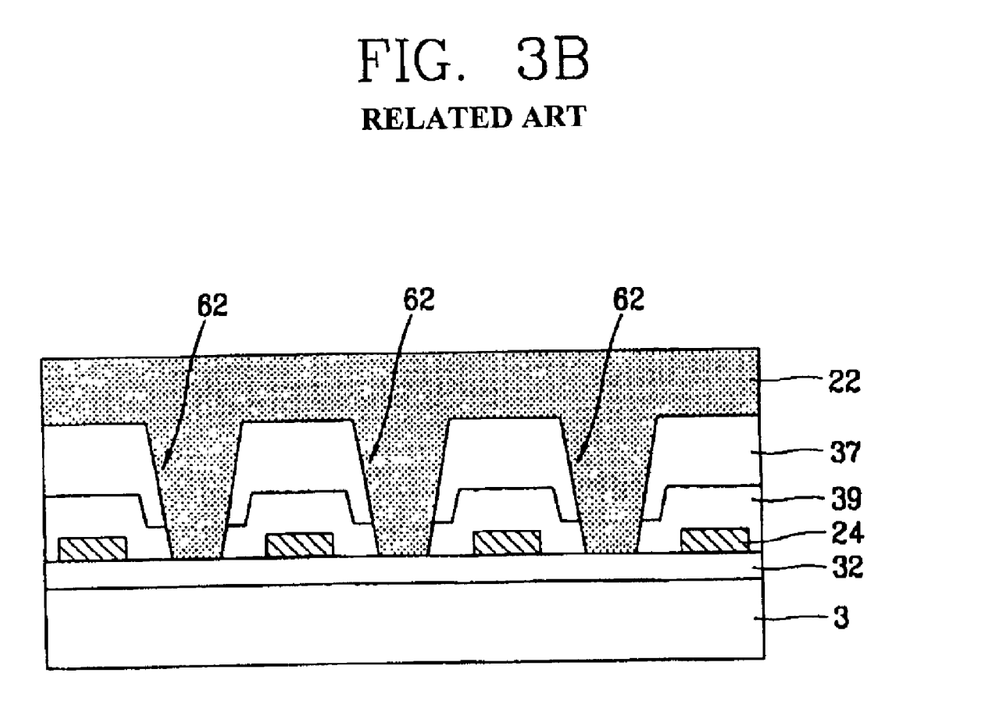
FIG. 3B is a cross sectional view taken along I–I' of FIGS. 1 and 3A.

FIG. 3A is a plan view of a sealing region of a liquid crystal display device according to the related art, and FIG. 3B is a cross sectional view taken along I–I' of FIGS. 1 and 3A. In FIGS. 3A and 3B, a plurality of openings 62 are formed in the inorganic passivation layer 39 and the organic passivation layer 37 between the plurality of metal layers 24 that are formed on the gate insulation layer 32. Accordingly, when the sealing material 22 is deposited within the sealing region 7 (in FIG. 1), the sealing material 22 fills the opening 62. If no openings 62 were provided, the sealing material 22 for attaching and sealing the liquid crystal panel would be directly deposited on the organic passivation layer 37. However, organic substances, such as photo acryl or BCB, and the sealing material do not easily bond together. Accordingly, if the liquid crystal panel is attached by depositing the sealing material 22 on the organic passivation layer 37, the sealing would be broken due to weak adhesion forces, thereby causing the injected liquid crystal material to leak into the liquid crystal panel.

Adhesion forces between inorganic substances, such as SiNx, and the sealing material are known to be relatively good. Accordingly, the opening 62 is formed at the inorganic passivation layer 39 and the organic passivation layer 37 between the metal layers 24 to expose the gate insulation layer 32, which is made of an inorganic substance. Then, the sealing material 22 is filled on the gate insulation layer 32 to directly attach a portion of the sealing material 22 onto the gate insulation layer 32, thereby seeking strengthening of adhesion force of the liquid crystal panel. In addition, the openings 62 of the sealing region 7 (in FIG. 1) is simultaneously formed when the contact hole 61 of the pixel region is formed.

However, although the adhesion force of the liquid crystal panel is improved by forming the openings 62 at the inorganic passivation layer 39 and the organic passivation layer 37 between the metal layers 24, bonding of the liquid crystal panel is problematic. For example, glass fibers are mixed within the sealing material 22, and the openings 62 formed between the metal layers 24 narrow along a direction toward the gate insulation layer 32. Accordingly, a width of the openings 62 near the gate insulation layer 32 is very small and may become clogged due to the glass fibers. Thus, the sealing material 22 would not completely fill the openings 62 to contact the gate insulation layer 32, thereby reducing the adhesion forces of the liquid crystal panel.

SUMMARY OF THE INVENTION

Accordingly, the present invention is directed to a liquid crystal display device and method for fabricating the same that substantially obviates one or more of the problems due to limitations and disadvantages of the related art.

An object of the present invention is to provide a liquid crystal display device with an improved adhesion force of a panel by minimizing a contact area between a sealing material and an organic passivation layer, and maximizing a contact area between the sealing material and an inorganic insulation layer by removing the organic passivation layer formed at a sealing region of a liquid crystal display device.

Another object of the present invention is to provide a method for fabricating a liquid crystal display device in which a patterning process of an insulation is performed through two steps such that a portion of an organic insulation layer of a sealing region is first removed in patterning an inorganic insulation layer of a pixel region and then the remaining organic insulation layer at the sealing region is removed in patterning the organic insulation layer of the pixel region, thereby forming an opening for filling a sealing material and improving an adhesion force of a panel.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display device includes a first substrate having a plurality of thin film transistors and a plurality of metal lines, a first insulation material layer formed on the metal lines, a second insulation material layer formed on the first insulation material layer on the metal lines, a first hole formed in the second insulation material layer over at least two of the metal lines, a second contact hole formed in the first and second insulation layers exposing a drain electrode of the thin film transistors, a pixel electrode connected to the drain electrode through the second contact hole, a sealing material formed within the first hole, a second substrate bonded to the first substrate via the sealing material, and a liquid crystal material disposed between the first and second substrates.

In another aspect, a method for fabricating a liquid crystal display device includes forming a plurality of metal layers on a sealing region of a first substrate, forming a thin film transistor within a pixel region of the first substrate, forming an inorganic passivation layer and an organic passivation layer over entire surface of the first substrate, removing a first portion of the organic passivation layer within the pixel region of the first substrate to expose a first portion of the inorganic passivation layer, removing a second portion of the organic passivation layer within the sealing region of the first substrate to leave a first thickness of the organic passivation layer above the metal layers, removing the first portion of the inorganic passivation layer within the pixel region to form a first contact hole, removing the first thickness of the organic passivation layer within the sealing region to form an first opening exposing a second portion of the inorganic passivation layer, forming a pixel electrode to electrically connect with the source/drain electrode through the first contact hole on the organic passivation layer within the pixel region, depositing a sealing material within the sealing region to fill the first opening, bonding a second substrate to the first substrate, and injecting liquid crystal material into a cell gap between the first and second substrates.

In another aspect, a method for fabricating a liquid crystal display device includes forming a thin film transistor within a pixel region of a first substrate, forming an inorganic insulating material layer and an organic insulating material layer over an entire surface of the first substrate, removing first portions of the organic insulating material layer by using a diffraction mask, removing first portions of the inorganic insulating material layer within the pixel region of the first substrate, removing second portions of the organic insulating material layer within a sealing region of the first substrate, forming a pixel electrode on the organic insulating material layer within the pixel region of the first substrate, depositing a sealing material onto the inorganic insulating material layer and the organic insulating material layer within the sealing region, bonding a second substrate to the first substrate using the sealing material, and injecting liquid crystal material within a cell gap between the first and second substrates.

In another aspect, a liquid crystal display device includes a first substrate having a pixel region and a sealing region, a plurality of metal lines disposed within the sealing region, a thin film transistor disposed within the pixel region, a first electrically insulating material disposed over the metal lines and the thin film transistor, a second electrically insulating material, different from the first electrically insulating material, disposed on the first electrically insulating material layer over the metal lines and the thin film transistor, a first hole formed within the second electrically insulating material over the metal lines, a second hole formed within the first and second electrically insulating materials exposing a drain electrode of the thin film transistor, a pixel electrode electrically connected to the drain electrode through the second hole, a sealing material formed within the first hole contacting the first electrically insulating material, a second substrate bonded to the first substrate via the sealing material, and a liquid crystal material disposed between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 4:
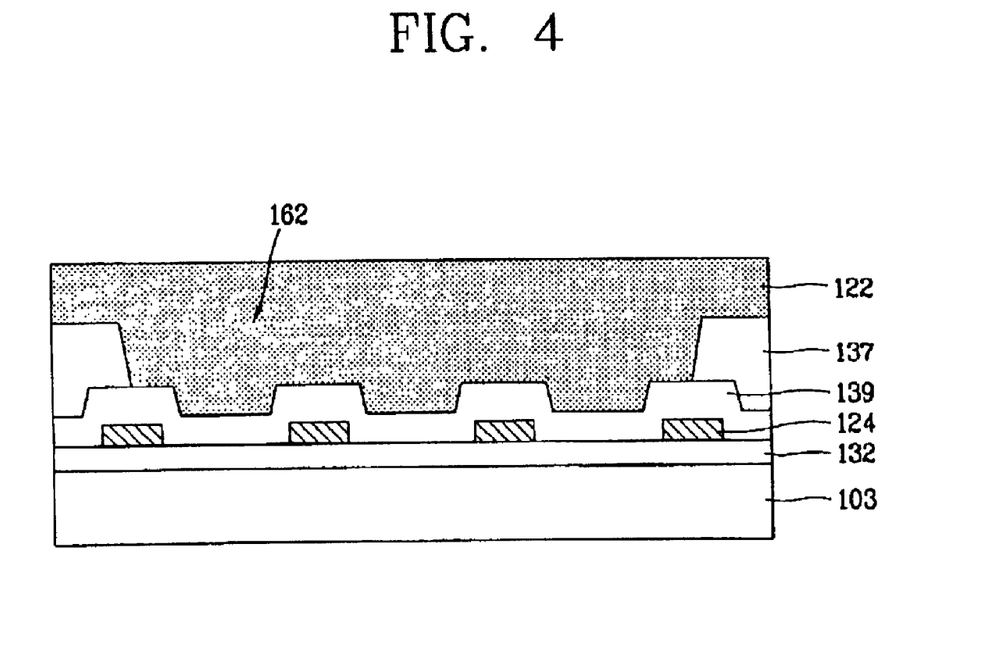
FIG. 4 is a cross sectional view of an exemplary sealing region of a liquid crystal display device in accordance with the present invention.

FIG. 4 is a cross sectional view of an exemplary sealing region of a liquid crystal display device in accordance with the present invention. In FIG. 4, an insulation layer 132 may be stacked upon a transparent substrate 103, and a plurality of metal layers 124 may be formed on the insulation layer 132. The metal layers 124 may be electrically connected to an external connecting pad (not shown). Alternatively, the metal layers 124 may be formed directly on the transparent substrate 103. An inorganic passivation layer 139 including inorganic substances may be formed on the metal layers 124, and an organic passivation layer 137 including organic substances may formed with an opening 162. The opening 162 may be formed to extend over at least two of the metal layers 124, and may extend over an entire sealing region of the transparent substrate 103 such that a relatively large area of the inorganic passivation layer 139 may be exposed. A sealing material 122 maybe deposited on the organic passivation layer 139 within the opening 162 and on the organic passivation layer 137. Accordingly, since the sealing material 122 is filled within a relatively wide area of the opening 162, a contact area between the sealing material 122 and the inorganic passivation layer 139 may be maximized, and a contact area between the sealing material 122 and the organic passivation layer 137 may be minimized. Thus, adhesion forces between the sealing material 122 and the inorganic passivation layer 139 may be improved. In addition, since a width of the opening 162 may be larger than a size of glass fibers contained in the sealing material 122, a liquid crystal material injection port (not shown) may not become clogged by the glass fibers.

Figure 5A:
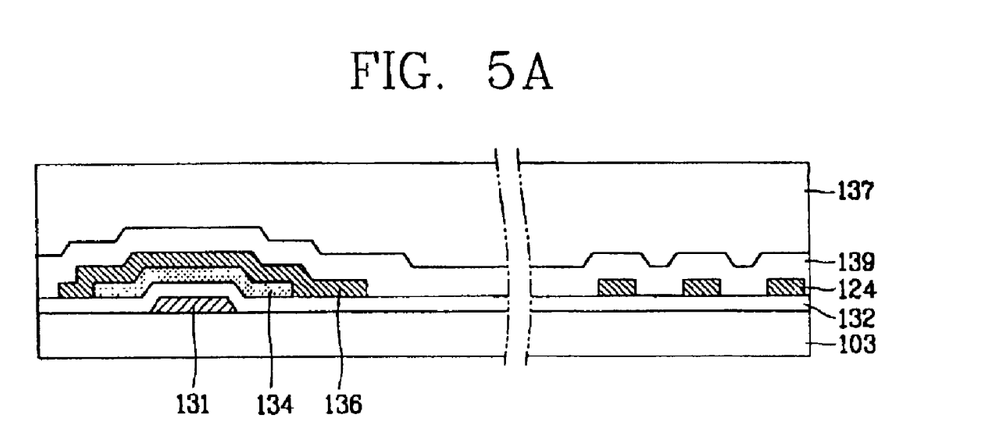
FIGS. 5A–5D are cross sectional views of exemplary sequential processes of a method for fabricating a liquid crystal display device in accordance with the present invention.

FIGS. 5A–5D are cross sectional views of exemplary sequential processes of a method for fabricating a liquid crystal display device in accordance with the present invention. In FIG. 5A, a thin film transistor including a gate electrode 131 may be formed within a pixel region on a transparent substrate 103, and a gate insulation layer 132 may be formed over an entire surface of the transparent substrate 103. Then, a semiconductor layer 134 may be formed on the gate insulation layer 132 within the pixel region, and a source/drain electrode layer 136 may be formed on the semiconductor layer 134. Within a sealing region, a plurality of metal layers 124 may be formed simultaneously during formation of the source/drain electrode layer 136. In addition, the metal layer 124 may be formed directly on the transparent substrate 103 during formation of the gate electrode 131. Then, the source/drain electrode layer 136 may be patterned to form individual source/drain electrodes.

Next, an inorganic substance, such as SiNx, may be formed over an entire surface of the transparent substrate 103 to form an inorganic passivation layer 139. Then, an organic passivation layer 137 may be formed by depositing an organic substance, such as photo acryl or BCB, onto an entire surface of the inorganic passivation layer 139. Alternatively, multiple inorganic substances may be used to form the inorganic passivation layer 139, and multiple organic substances may be used to form the organic passivation layer 137.

A mask (not shown) may be positioned at an upper portion of the transparent substrate 103 to correspond with a region where the thin film transistor is formed. Then, light, such as an ultraviolet light, may be irradiated onto the organic passivation layer 137. For example, a diffraction mask may be used that may include a light interrupting part for interrupting the irradiated light, a light transmission part for transmitting the irradiated light, and light diffraction part having a plurality of slits for diffracting the irradiated light. The light transmission part may be positioned to correspond with the source/drain electrodes 136 of the thin film transistor, and the diffraction part may be positioned to correspond with the sealing region. Thus, the irradiated light diffracted by the plurality of slits of the diffraction part may not penetrate as far into a first portion of the organic passivation layer 137 corresponding to the sealing region as compared to a second portion of the organic passivation layer 137 corresponding to the pixel region. Accordingly, a strength of the irradiated light diffracted by the light diffraction part may be controlled according to a total number of slits or intervals between adjacent slits. Alternatively, other methods may be used to control the degree of diffraction of the irradiated light.

Figure 5B:
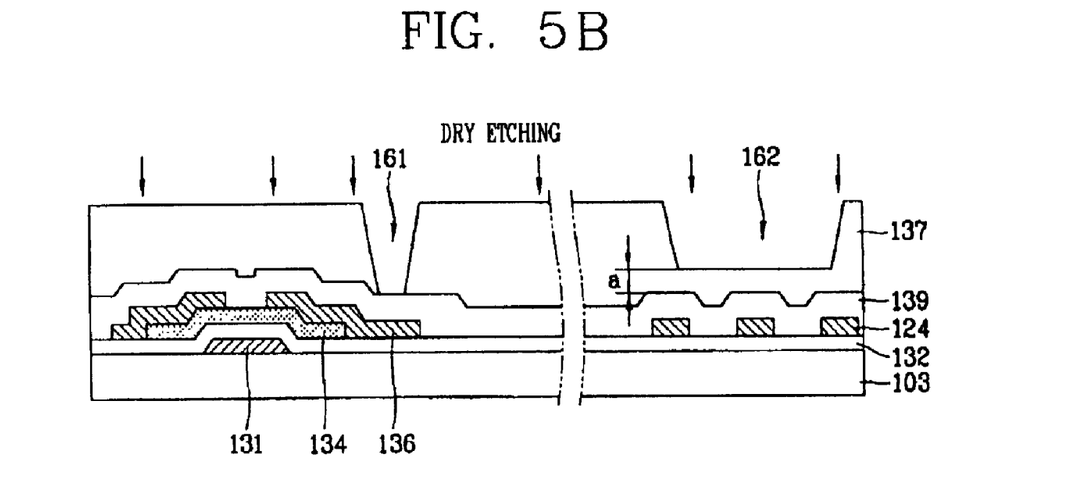

In FIG. 5B, a developing method may be applied to the first portion of the organic passivation layer 137 to remove a first thickness portion of the organic passivation layer 137, thereby forming a first via 162 that corresponds to the diffraction part of the mask. Accordingly, a thickness "a" of the organic passivation layer 137 remains over the inorganic passivation layer 139 above the metal layers 124 within the sealing region. In addition, the developing method may also be simultaneously applied to the second portion of the organic passivation layer 137 to remove a second thickness portion of the organic passivation layer 137 to expose a first portion of the inorganic passivation layer 139 within the pixel region, thereby forming a contact hole 161 corresponding to the light transmission part of the mask. Then, an etching process may be performed to remove the thickness "a" portion of the inorganic passivation layer 137 corresponding to the metal layers 124 within the sealing region to expose upper portions of the inorganic passivation layer 139. In addition, the etching process may also be simultaneously performed to remove the first portion of the inorganic passivation layer 139 corresponding to the source/drain electrode 136.

Figure 5C:
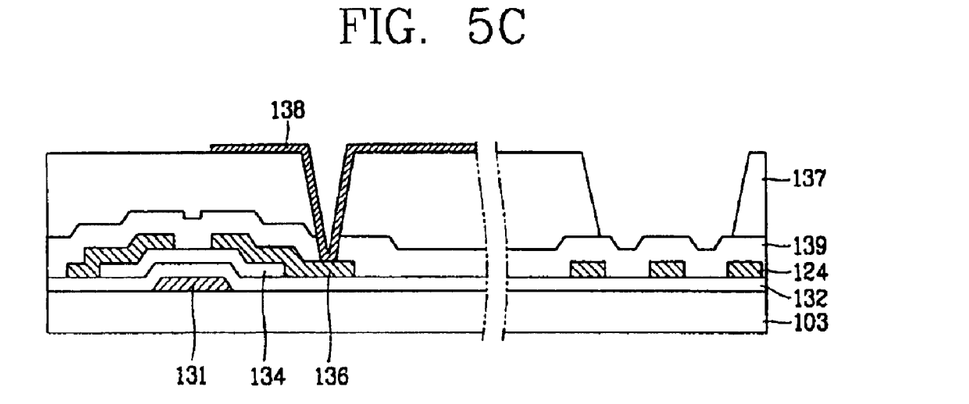

In FIG. 5C, a transparent metal, such as ITO, may be formed within the contact hole 161 within a pixel region to form a pixel electrode 138 that is electrically connected to the source/drain electrode 136. Then, an alignment layer (not shown) may be formed on the pixel electrode 138 and the organic passivation layer 137.

Figure 5D:
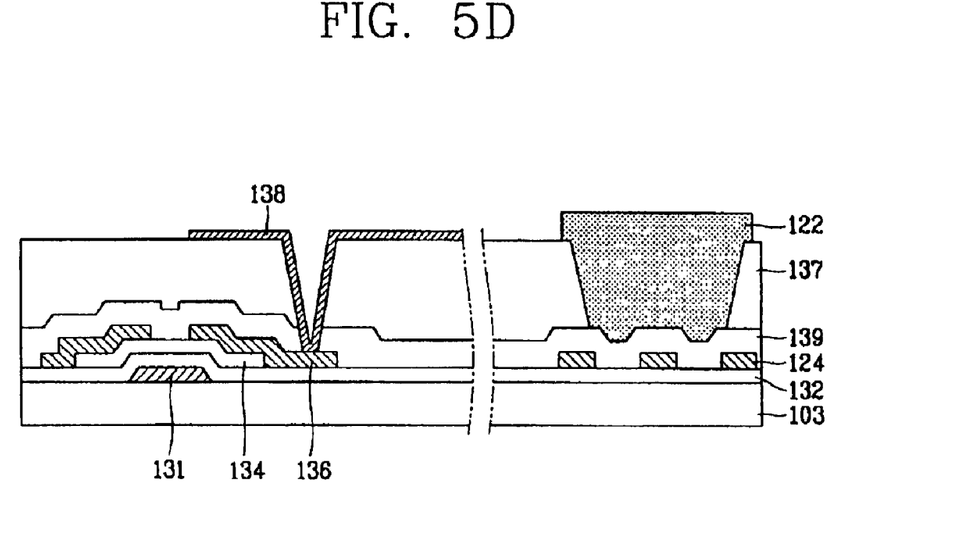

In FIG. 5D, a sealing material 122 may be deposited within the sealing region as to fill the first via 162 formed on the inorganic passivation layer 137 to directly contact the inorganic passivation layer 139. The sealing material 122 may extend past an upper surface of the inorganic passivation layer 137 and may extend past sidewalls of the first via 162. In addition, the sidewalls of the first via 162 may include different tapered angles, and portions of the organic passivation layer 139 between adjacent ones of the metal layers 124 may be adjusted to increase a contact surface area of between the sealing material 122 and the organic passivation layer 139.

Next, a color filter substrate (not shown) may be bonded to the transparent substrate 103, and liquid crystal material may be injected into a cell gap between the transparent substrate 103 and the color filter substrate (not shown), thereby forming a liquid crystal display device.

As so far described, in the present invention, the organic passivation layer formed at the sealing region of the liquid crystal display device may be removed by the developing and etching processes when the contact hole of the thin film transistor is formed by using the diffraction mask. Therefore, since the sealing material deposited at the sealing region contacts the inorganic passivation layer at the widest area and contacts the organic passivation layer at the least area, the degradation of adhesion force of the liquid crystal panel due to inadequate bonding between the organic passivation layer and the sealing material may be prevented. Since the inorganic passivation layer formed at the lower portion of the organic passivation layer is not removed, the sealing material does not contact the metal layer. Accordingly, improved adhesion force can be obtained.

In the present invention, in order to strengthen an adhesion force of a liquid crystal panel with an organic passivation layer formed thereon, the organic passivation layer of a sealing region is removed to minimize a contact area between a sealing material and the organic passivation layer and maximize a contact area between the sealing material and an inorganic passivation layer.

In addition, the organic substances may include material having a low dielectric constant. Accordingly, if the gate line or the data line is overlapped with the pixel electrode, little parasitic capacitance is generated. Thus, since the pixel electrode can be disposed to overlap the gate line or the data line, the liquid crystal display device has a high aperture ratio compared with the liquid crystal display device with only an inorganic passivation layer. In the present invention, the organic passivation layer formed at the sealing region of the liquid crystal display device with such an organic passivation layer is removed to form an opening for filling a sealing material, thereby increasing a contact area between the sealing material and the inorganic passivation layer, and thus improving an adhesion force of the liquid crystal panel.

According to the present invention, the opening formed at the sealing region may be formed at the same time as when the contact hole of the thin film transistor is formed. However, the organic passivation layer and the inorganic passivation layer may both be removed at the contact hole while only the organic passivation layer may be removed at the sealing region. That is, patterning of the passivation layer may be divided into two stages. The first stage may include completely removing the organic passivation layer and at the same time only removing a portion of the organic passivation layer within the sealing region so that a certain thickness of the organic passivation layer remains. The second stage may include removing the inorganic passivation layer of the thin film transistor and the remaining inorganic passivation layer of the sealing region together, wherein only the inorganic passivation layer is exposed at the opening of the sealing region. Accordingly, even if a portion of the inorganic passivation layer is removed, since the sealing material directly contacts the inorganic passivation layer, a portion of the inorganic passivation layer can be etched.

It will be apparent to those skilled in the art that various modifications and variations can be made in the liquid crystal display device and method for fabricating the same of the present invention without departing from the spirit or scope of the invention. Thus, it is intended that the present invention cover the modifications and variations of this invention provided they come within the scope of the appended claims and their equivalents.

What is claimed is:

1. A method for fabricating a liquid crystal display device, comprising the steps of:

forming a plurality of metal layers on a sealing region of a first substrate;

forming a thin film transistor within a pixel region of the first substrate;

forming an inorganic passivation layer and an organic passivation layer over entire surface of the first substrate;

removing a first portion of the organic passivation layer within the pixel region of the first substrate to expose a first portion of the inorganic passivation layer;

removing a second portion of the organic passivation layer within the sealing region of the first substrate to leave a first thickness of the organic passivation layer above the metal layers;

removing the first portion of the inorganic passivation layer within the pixel region to form a first contact hole;

removing the first thickness of the organic passivation layer within the sealing region to form an first opening exposing a second portion of the inorganic passivation layer;

forming a pixel electrode to electrically connect with the source/drain electrode through the first contact hole on the organic passivation layer within the pixel region;

depositing a sealing material within the sealing region to fill the first opening;

bonding a second substrate to the first substrate; and injecting liquid crystal material into a cell gap between the first and second substrates.

2. The method according to claim 1, wherein the step of forming a thin film transistor comprises:

forming a gate electrode on the first substrate;

forming a gate insulation layer on the gate electrode and entire surface of the first substrate;

forming a semiconductor layer on the gate insulation layer; and forming a source/drain electrode on the semiconductor layer.

3. The method according to claim 1, wherein the step of removing a first portion of the organic passivation layer within the pixel region and the step of removing a second portion of the organic passivation layer of the sealing region each comprise:

simultaneously irradiating light onto the first and second portions of organic passivation layer using a diffraction mask positioned on the first substrate; and     simultaneously applying a developer to the irradiated first and second portions of the organic passivation layer.

4. The method according to claim 1, wherein the organic passivation layer includes at least one of photo acryl and benzocyclobutene.

5. A method for fabricating a liquid crystal display device, comprising the steps of:

forming a thin film transistor within a pixel region of a first substrate;

forming an inorganic insulating material layer and an organic insulating material layer over an entire surface of the first substrate;

removing first portions of the organic insulating material layer by using a diffraction mask;

removing first portions of the inorganic insulating material layer within the pixel region of the first substrate;

removing second portions of the organic insulating material layer within a sealing region of the first substrate;

forming a pixel electrode on the organic insulating material layer within the pixel region of the first substrate;

depositing a sealing material onto the inorganic insulating material layer and the organic insulating material layer within the sealing region;

bonding a second substrate to the first substrate using the sealing material; and     injecting liquid crystal material within a cell gap between the first and second substrates.

* * * * *